United States Patent
Zhu

(10) Patent No.: US 12,553,451 B2
(45) Date of Patent: *Feb. 17, 2026

(54) FAN

(71) Applicant: Guangdong Aoyun Technology Co., Ltd., Guangdong (CN)

(72) Inventor: Xueping Zhu, Guangdong (CN)

(73) Assignee: Guangdong Aoyun Technology Co., Ltd., Huizhou (CN)

( * ) Notice: Subject to any disclaimer, the term of this patent is extended or adjusted under 35 U.S.C. 154(b) by 0 days.

This patent is subject to a terminal disclaimer.

(21) Appl. No.: 19/074,023

(22) Filed: Mar. 7, 2025

(65) Prior Publication Data

US 2025/0305518 A1 Oct. 2, 2025

Related U.S. Application Data

(63) Continuation-in-part of application No. 18/629,587, filed on Apr. 8, 2024, now Pat. No. 12,270,417.

(30) Foreign Application Priority Data

Mar. 27, 2024 (CN) .......................... 202420615199.8

(51) Int. Cl.

| F04D 29/64 | (2006.01) |
|---|---|
| F04D 19/00 | (2006.01) |
| F04D 25/06 | (2006.01) |
| F04D 25/08 | (2006.01) |
| F04D 29/56 | (2006.01) |

(Continued)

(52) U.S. Cl.
CPC ......... *F04D 29/646* (2013.01); *F04D 19/002* (2013.01); *F04D 25/0673* (2013.01);
(Continued)

(58) Field of Classification Search
CPC .... F04D 29/563; F04D 29/601; F04D 29/646; F04D 29/703; F04D 29/542;
(Continued)

(56) References Cited

U.S. PATENT DOCUMENTS 2,022,920 A * 12/1935 Lyss ...................... F04D 25/105
310/116
4,570,887 A * 2/1986 Banister ............... F16M 11/041
248/223.41

(Continued)

FOREIGN PATENT DOCUMENTS

KR 10-2020-0119594 A * 10/2020

OTHER PUBLICATIONS

English machine translation of KR-10-2020-0119594-A, Jun. 18, 2025.*

*Primary Examiner* — Christopher Verdier
(74) *Attorney, Agent, or Firm* — Hemisphere Law, PLLC

(57) ABSTRACT

A fan includes a main body of the fan and a bracket assembly. The main body is connected to the bracket assembly. The main body includes a blower part for blowing air, a rotating bracket and a main unit. The rotating bracket is arranged between the blower part and the main unit and is configured to connect the blower part and the main unit. The main unit is configured to control air blowing of the blower part. The bracket assembly includes at least one bendable and shapeable supporting leg configured to fix the fan to an external object. A rotating bracket is rotatably connected to both the blower part and the main unit, enabling vertical and horizontal rotation of the blower part. This configuration achieves multi-angle adjustment of the blower part, simplifies user control over airflow direction, and thereby significantly improves user experience.

16 Claims, 17 Drawing Sheets

(51) Int. Cl.
*F04D 29/60* (2006.01)
*F04D 29/70* (2006.01)
*F16M 11/40* (2006.01)
*F16M 13/02* (2006.01)

(52) U.S. Cl.
CPC ......... *F04D 29/563* (2013.01); *F04D 29/601* (2013.01); *F04D 29/703* (2013.01); *F16M 11/40* (2013.01); *F16M 13/02* (2013.01); *F04D 25/0606* (2013.01); *F04D 25/08* (2013.01)

(58) Field of Classification Search
CPC .... F04D 29/544; F04D 25/0673; F04D 25/08; F04D 25/06; F04D 25/0606; F04D 25/10; F04D 25/105; F16M 11/40; F16M 13/02

USPC ................... 416/246, 247 R; 248/126, 163.1
See application file for complete search history.

(56) References Cited

U.S. PATENT DOCUMENTS

| | | | | |
|---|---|---|---|---|
| 8,197,149 | B2* | 6/2012 | Darrow | F16M 11/36 |
| | | | | 396/428 |
| 11,619,342 | B1* | 4/2023 | Chen | F04D 29/646 |
| | | | | 248/188.8 |
| 12,104,743 | B1* | 10/2024 | Zhou | F16M 11/08 |
| 12,270,417 | B1* | 4/2025 | Zhu | F16M 13/02 |
| 2020/0011338 | A1* | 1/2020 | Lin | F04D 25/105 |
| 2021/0308315 | A1* | 10/2021 | Zeng | F04D 29/705 |
| 2025/0154959 | A1* | 5/2025 | Tan | F04D 25/084 |

* cited by examiner

FAN

CROSS-REFERENCE TO RELATED APPLICATIONS

This application is a Continuation-in-Part of the U.S. application Ser. No. 18/629,587 filed on Apr. 8, 2024, and entitled "BRACKET ASSEMBLY AND FAN WITH BRACKET ASSEMBLY", now U.S. Pat. No. 12,270,417, which claims priority to Chinese Patent Application No. 202420615199.8, filed on Mar. 27, 2024, the entire disclosures of which are incorporated herein by reference.

TECHNICAL FIELD

The present invention relates to a field of fans, in particular to a fan.

BACKGROUND ART

Existing fans on the market are predominantly mounted via fixed support bases or clips, and adjusting the air blowing direction and angle is cumbersome. These conventional installation methods limit the applicability of the fans, significantly impacting user experience. Therefore, there is an urgent need to provide a fan capable of multi-scenario usage, featuring easy and stable installation and angle adjustability to enhance user experience.

SUMMARY

In order to overcome the shortcomings of the prior art, the present invention provides a fan. The fan includes a main body of the fan and a bracket assembly.

The main body of the fan is connected to the bracket assembly. The main body of the fan includes a blower part for blowing air and a main unit, and the main unit is configured to control air blowing of the blower part. The bracket assembly includes at least one bendable and shapeable supporting leg configured to fix the fan to an external object.

Furthermore, the main body of the fan further includes a rotating bracket, the rotating bracket is arranged between the blower part and the main unit and is configured to connect the blower part and the main unit, thereby enabling the blower part to rotate and adjust a blowing angle.

Furthermore, the rotating bracket is rotatably connected to the blower part, thereby enabling the blower part to be rotated in a vertical direction; the rotating bracket is further rotatably connected to the main unit, thereby enabling the blower part and the rotating bracket to be rotated in a horizontal direction.

Furthermore, an end portion of the rotating bracket is equipped with a connecting arm, and the connecting arm is rotatably connected to the blower part.

Furthermore, the blower part is equipped with a first connection hole, a first connection shaft matching the first connection hole is arranged on an inner wall of the connecting arm, and the first connection shaft is inserted into the first connection hole, thereby rotatably connecting the rotating bracket to the blower part.

Furthermore, the rotating bracket is further equipped with a second connection shaft, a second connection hole matching the second connection shaft is arranged on the main unit, and the second connection shaft is inserted into the second connection hole, thereby enabling the rotating bracket to be rotatably connected to the main unit.

Furthermore, the rotating bracket is U-shaped, the number of the connecting arms is two, and the connecting arms are positioned on both sides of the rotating bracket.

Furthermore, the blower part includes an air outlet hood, a surrounding outer wall, fan blades, a motor, and an air inlet hood; the air outlet hood and the air inlet hood are oppositely positioned at two ends of the outer wall, and the fan blades are connected to the motor and arranged inside the outer wall; the air outlet hood is equipped with a plurality of spiral blades; the outer wall is equipped with a plurality of protruding strips; mesh holes on the air inlet hood are hexagonal; and the first connection hole is positioned on the outer wall.

Furthermore, the main body of fan further includes an external conductive wire, and the blower part and the main unit are electrically connected through the conductive wire.

Furthermore, the main unit includes a first shell and a second shell, and the first shell and the second shell are connected to form an accommodating space; the main unit defines an upper surface on both the first shell and the second shell, and an opposite lower surface on both the first shell and second shell, the rotating bracket is rotatably connected to the upper surface; the main unit further includes a switch button, an indicator light, a power interface arranged on the first shell, and a control mainboard and a battery arranged within the accommodating space; the switch button, the indicator light and the power interface are electrically connected to the control mainboard, and the control mainboard is electrically connected to the battery; the second connection hole is positioned on both the first shell and the second shell.

Furthermore, the bracket assembly further includes an installation bracket, the installation bracket is equipped with an installation part, and the supporting leg is detachably connected to the installation part.

Furthermore, the main unit is equipped with an installation fitting part, and the installation part is connected to the installation fitting part.

Furthermore, the supporting leg includes a flexible protective sleeve, and a bendable and shapeable metal wire, and the metal wire is arranged inside the flexible protective sleeve, so that the flexible protective sleeve covers the metal wire.

Furthermore, the installation part is equipped with an installation opening, and the supporting leg is inserted into the installation opening.

Furthermore, one end of the supporting leg is equipped with a first stop part, the supporting leg passes through the installation opening from an upper surface of the installation bracket to a lower surface of the installation bracket, and the installation bracket retains the first stop part on the upper surface of the installation bracket.

Furthermore, the supporting leg is further equipped with an insertion part, and the insertion part is inserted into the installation opening.

Furthermore, the metal wire extends from one end of the flexible protective sleeve to the other end of the flexible protective sleeve, an end of the metal wire is equipped with a stop ring, and the stop ring is positioned within the first stop part.

Furthermore, the flexible protective sleeve includes a plurality of protrusions and a plurality of grooves, and the plurality of protrusions and the plurality of grooves are arranged at intervals with each other.

Furthermore, the installation bracket is further equipped with a sliding block, the installation fitting part is a sliding groove, and the sliding block is connected to the sliding groove.

Furthermore, when the sliding block is connected to the sliding groove, the installation bracket and an inner wall of the sliding groove cooperatively clamp the first stop part.

The present invention provides a fan. A rotating bracket is rotatably connected to both a blower part and a main unit, enabling vertical and horizontal rotation of the blower part. This configuration achieves multi-angle adjustment of the blower part, simplifies user control over airflow direction, and thereby significantly improves user experience. The installation bracket is equipped with the installation part. The supporting leg is connected to the installation part. Therefore, users can connect the installation bracket to the external device, thereby attaching the bendable and shapeable supporting leg to the external device, so that the external device can be suspended or supported on an external object through the bendable and shapeable supporting leg. At the same time, a support angle of the supporting leg can be adjusted by bending the supporting leg, so as to adjust an angle of the external device. Moreover, a total number of the supporting legs can be set to 3-10, so that the supporting legs can be combined with each other to form an octopus shape to provide more stable support. For example, when it is necessary to hang the external device on a shelf, the supporting leg can be bent into an annular shape, so as to hang the supporting leg on the shelf, and a hanging angle of the external device can be adjusted through the bendable supporting leg. For another example, when it is necessary to place the external device on a flat surface such as a desktop, the supporting leg can be bent to form a support surface, so as to place the supporting leg on the flat surface such as the desktop, and a placement angle of the external device can be adjusted trough the bendable supporting leg.

BRIEF DESCRIPTION OF THE DRAWINGS

Implementations of the present invention will now be described, by way of embodiment, with reference to the attached figures. It should be understood, the drawings are shown for an illustrative purpose only, for an ordinary person skilled in the art, other drawings obtained from these drawings without paying creative labor by an ordinary person skilled in the art should be within scope of the present invention.

DETAILED DESCRIPTION OF THE EMBODIMENTS

Figure 1:
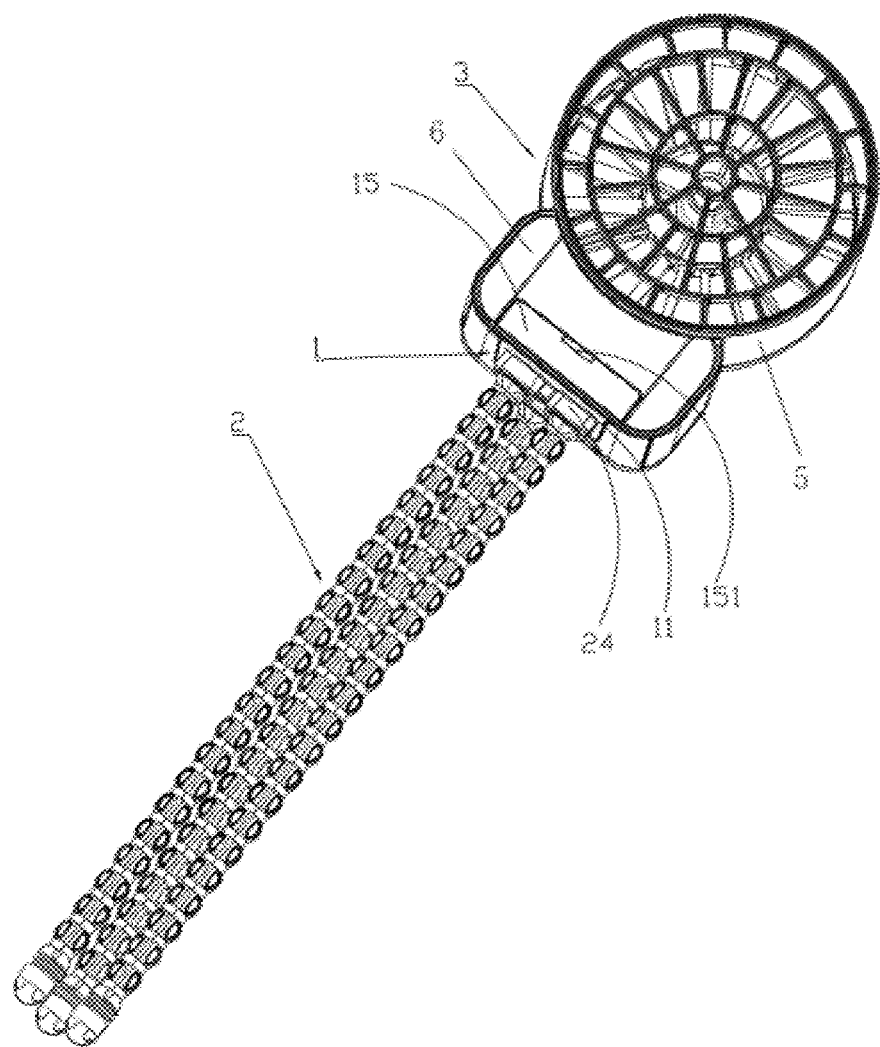
FIG. 1 is a schematic diagram of an overall structure of the fan according to Embodiment 1 of the present invention.

It will be appreciated that for simplicity and clarity of illustration, where appropriate, reference numerals have been repeated among the different figures to indicate corresponding or analogous elements. In addition, numerous specific details are set forth in order to provide a thorough understanding of the exemplary embodiments described herein. However, it will be understood by those of ordinary skill in the art that the exemplary embodiments described herein may be practiced without these specific details. In other instances, methods, procedures, and components have not been described in detail so as not to obscure the related relevant feature being described. Also, the description is not to be considered as limiting the scope of the exemplary embodiments described herein. The drawings are not necessarily to scale and the proportions of certain parts may be exaggerated to better illustrate details and features of the present invention.

The term "comprising" when utilized, means "including, but not necessarily limited to"; it specifically indicates open-ended inclusion or membership in the so-described combination, group, series, and the like. The invention is illustrated by way of example and not by way of limitation in the figures of the accompanying drawings in which like references indicate similar elements. It should be noted that references to "an" or "one" embodiment in this invention are not necessarily to the same embodiment, and such references can mean "at least one". In addition, the terms "first" and "second" are used for descriptive purposes only and cannot be understood as indicating or implying relative importance or implying the number of indicated technical features. Thus, the features defined as "first" and "second" may explicitly or implicitly include one or more of the features. In the description of embodiments of the application, "a plurality of" means two or more, unless otherwise specifically defined.

Embodiment 1

Figure 2:
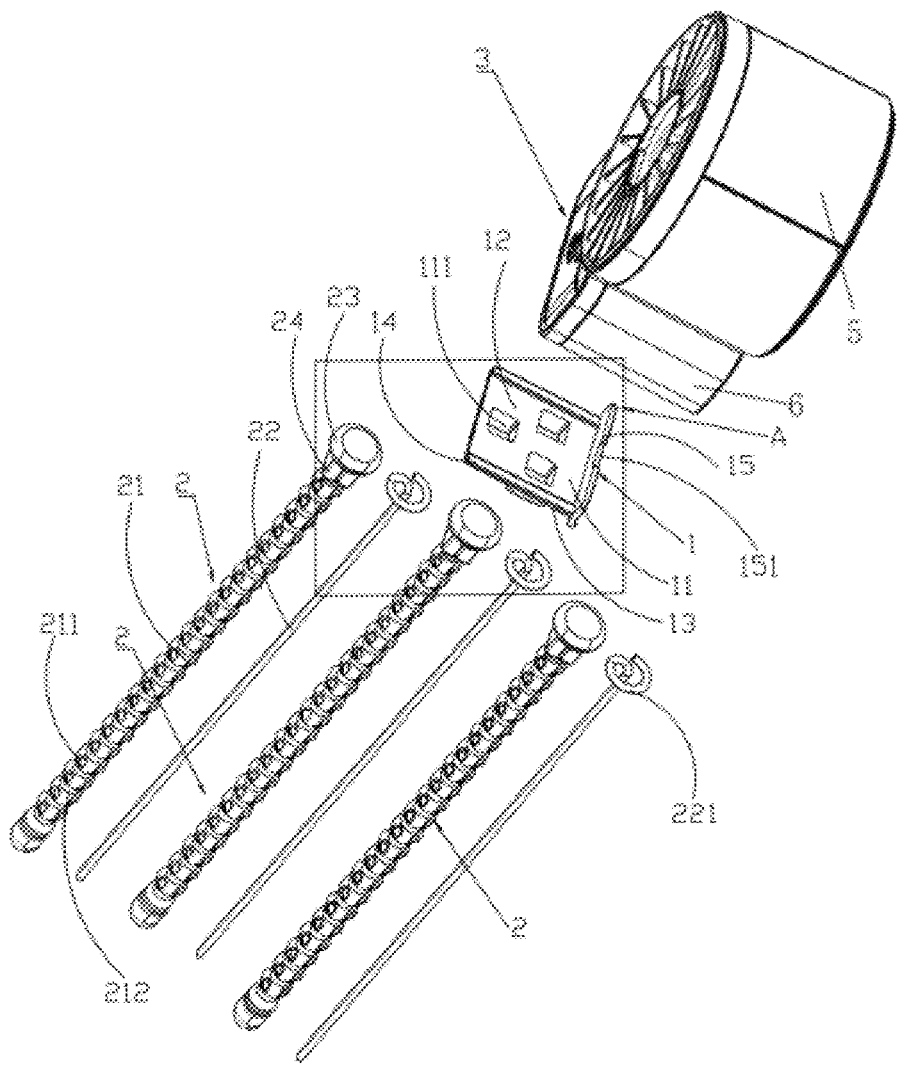
FIG. 2 is an exploded view of the fan according to Embodiment 1 of the present invention.
Figure 3:
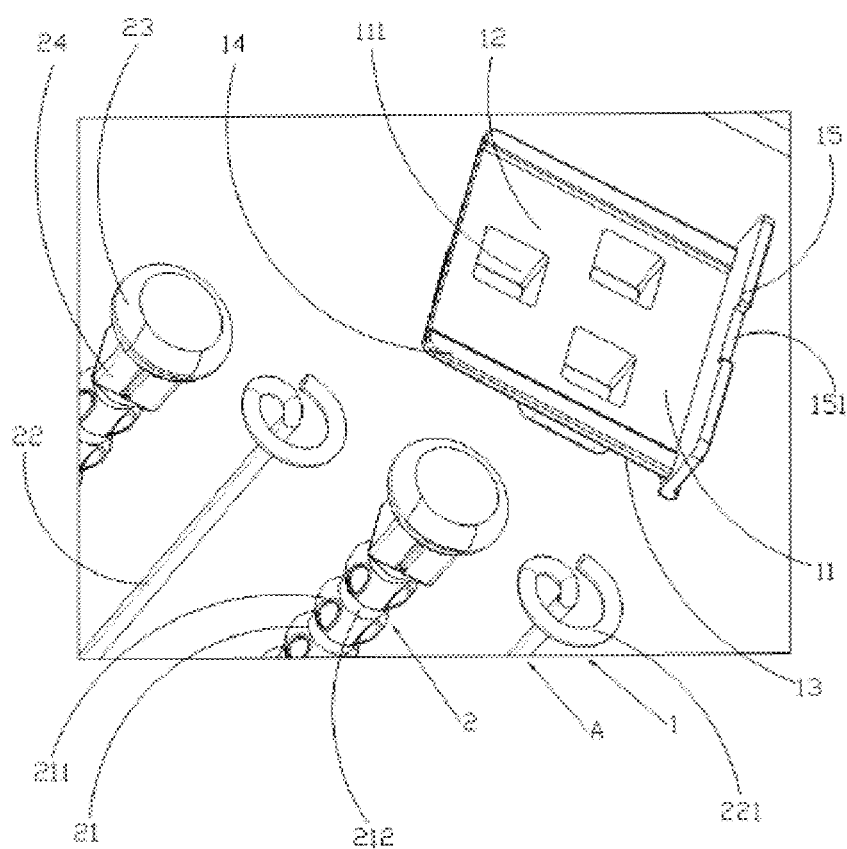
FIG. 3 is an enlarged view of Area A in FIG. 2.
Figure 4:
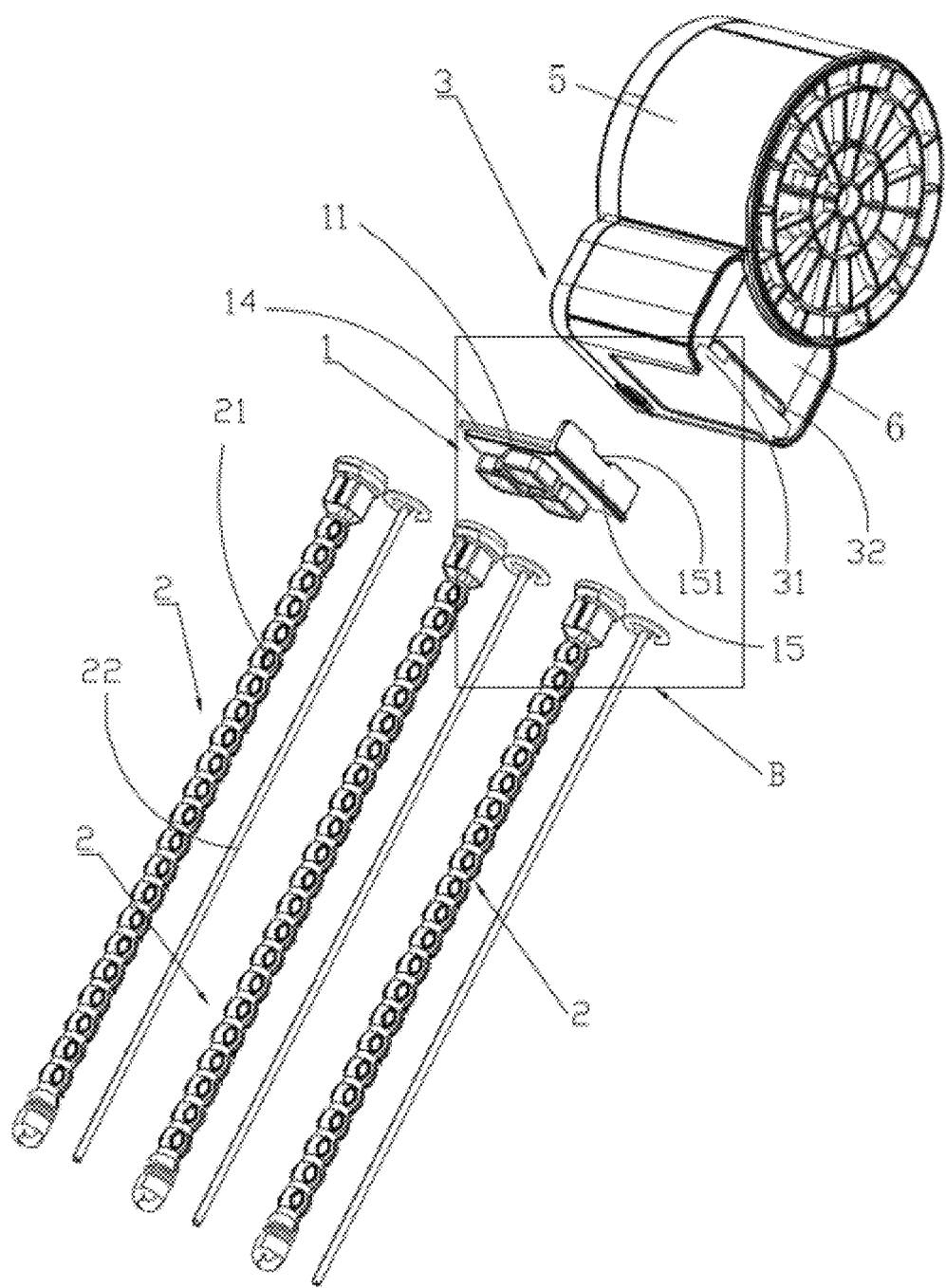
FIG. 4 is another exploded view of the fan according to Embodiment 1.
Figure 5:
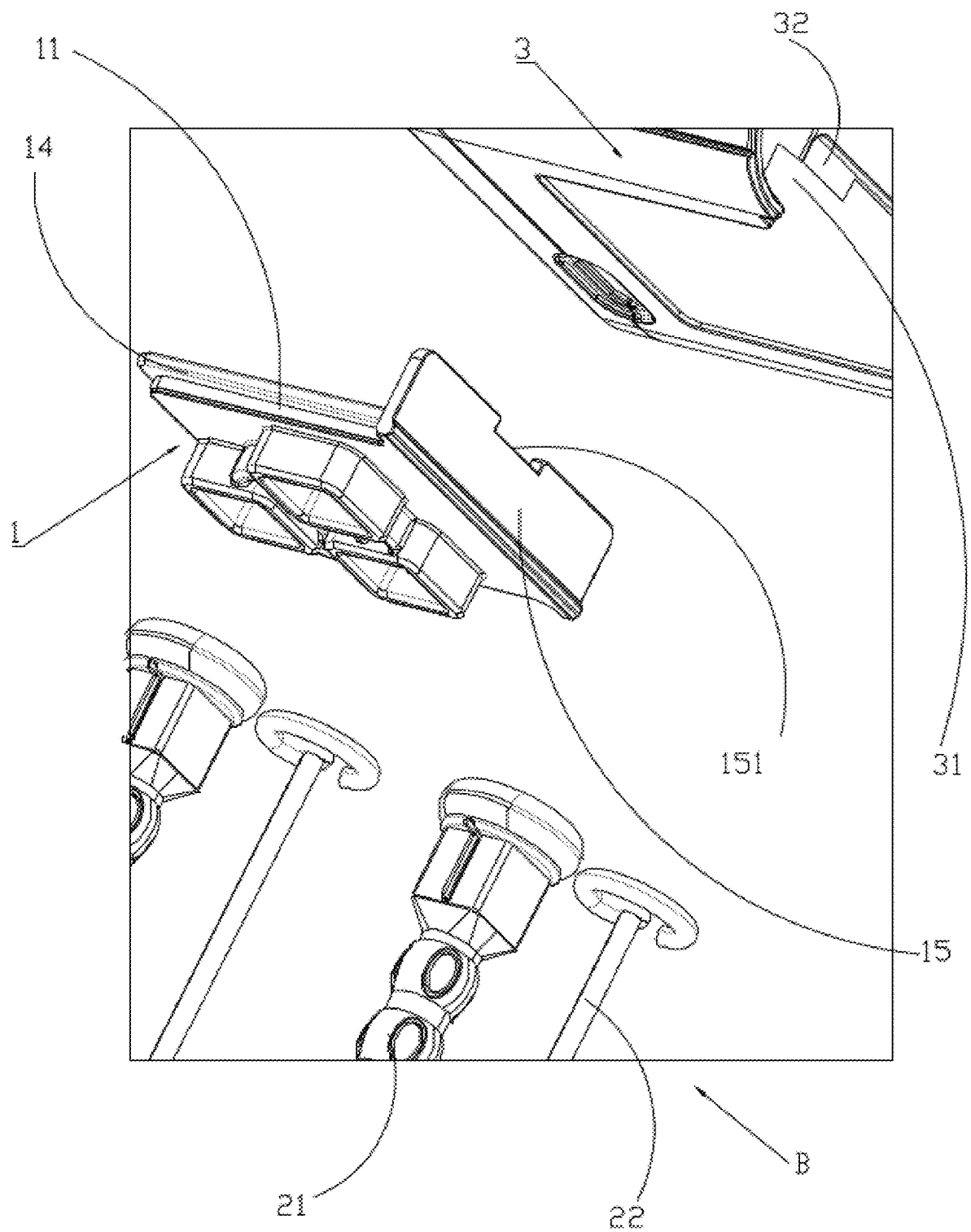
FIG. 5 is an enlarged view of Area B in FIG. 4.
Figure 6:
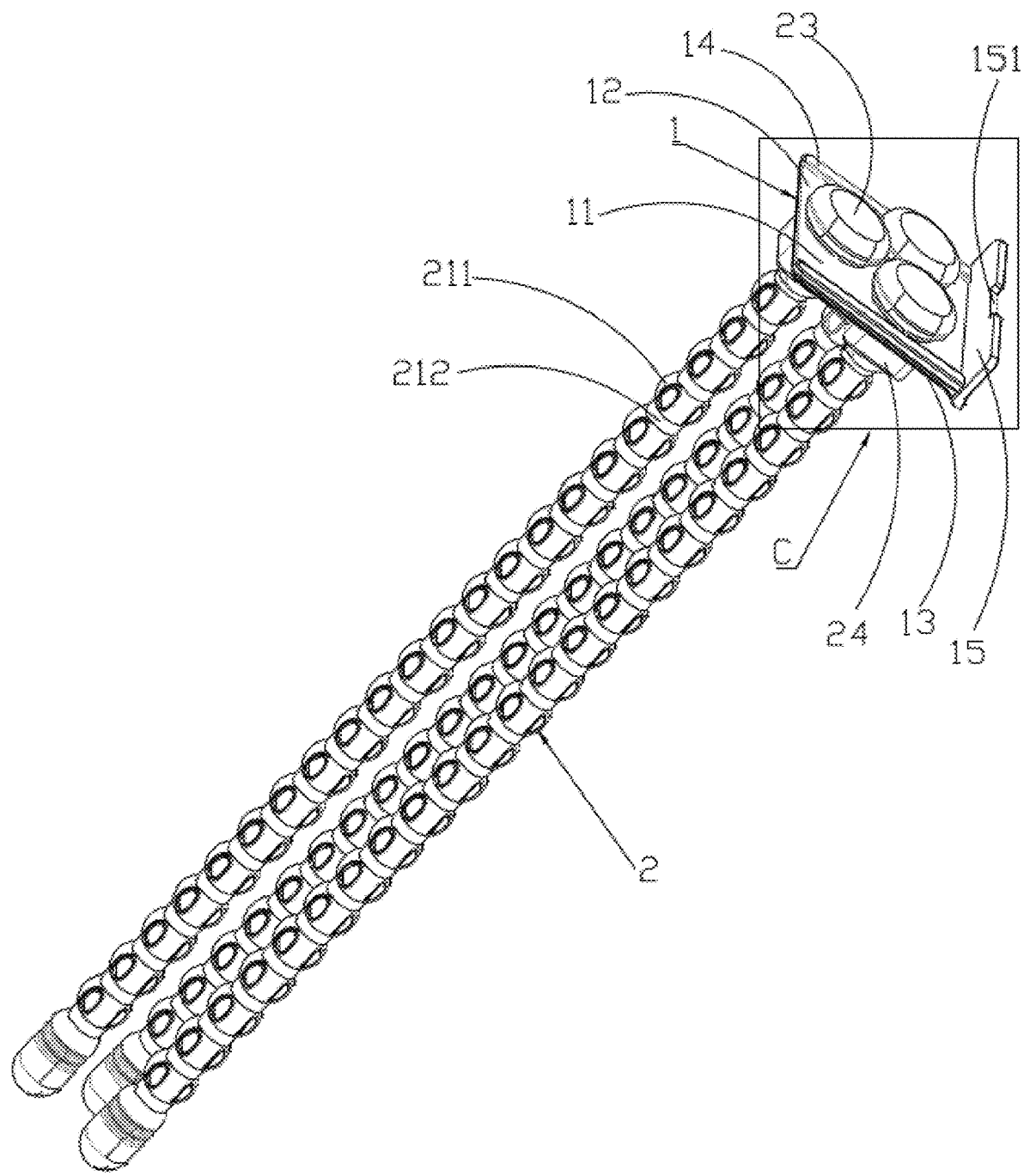
FIG. 6 is a schematic diagram of a structure of the fan according to Embodiment 1.
Figure 7:
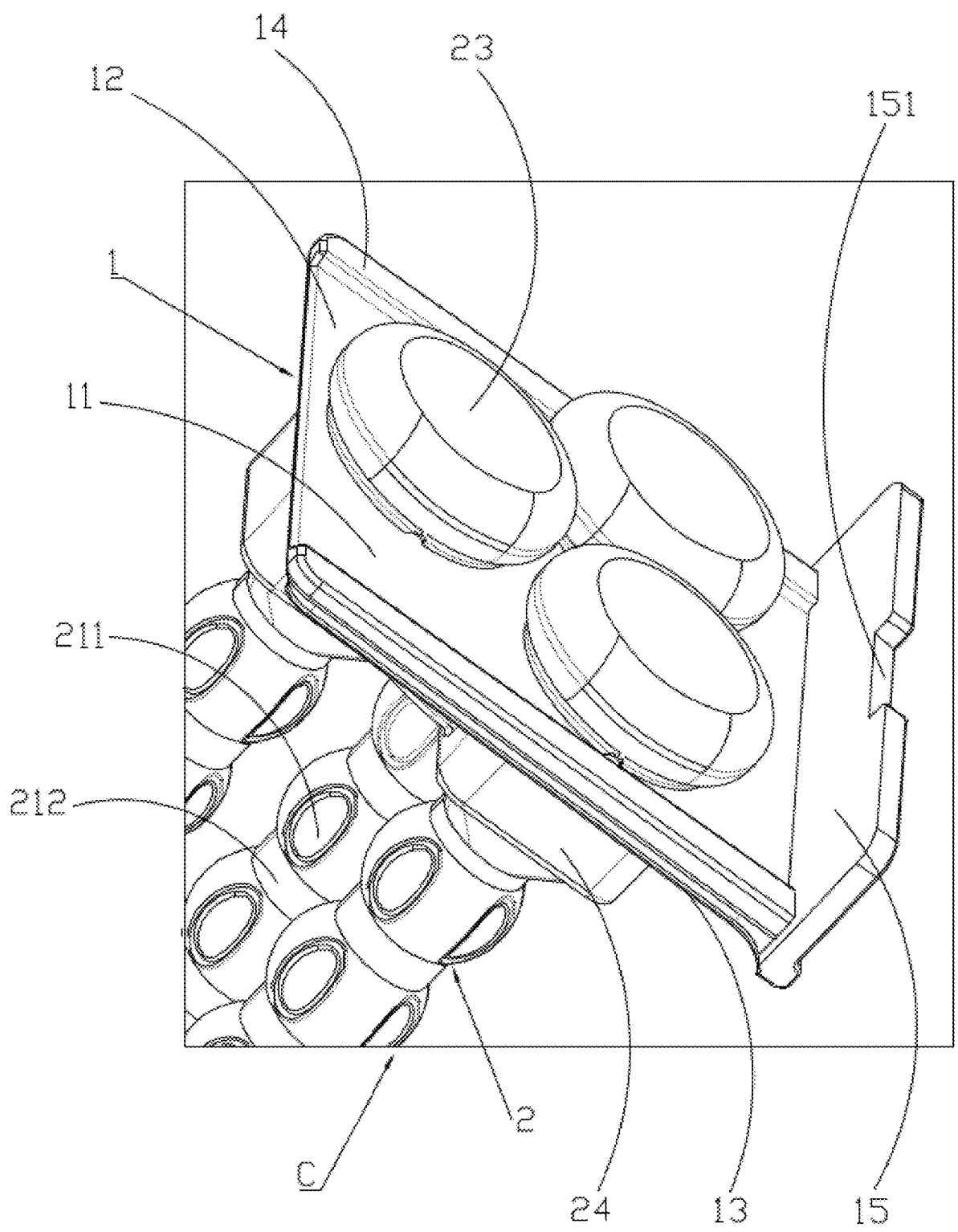
FIG. 7 is an enlarged view of Area C in FIG. 6.
Figure 8:
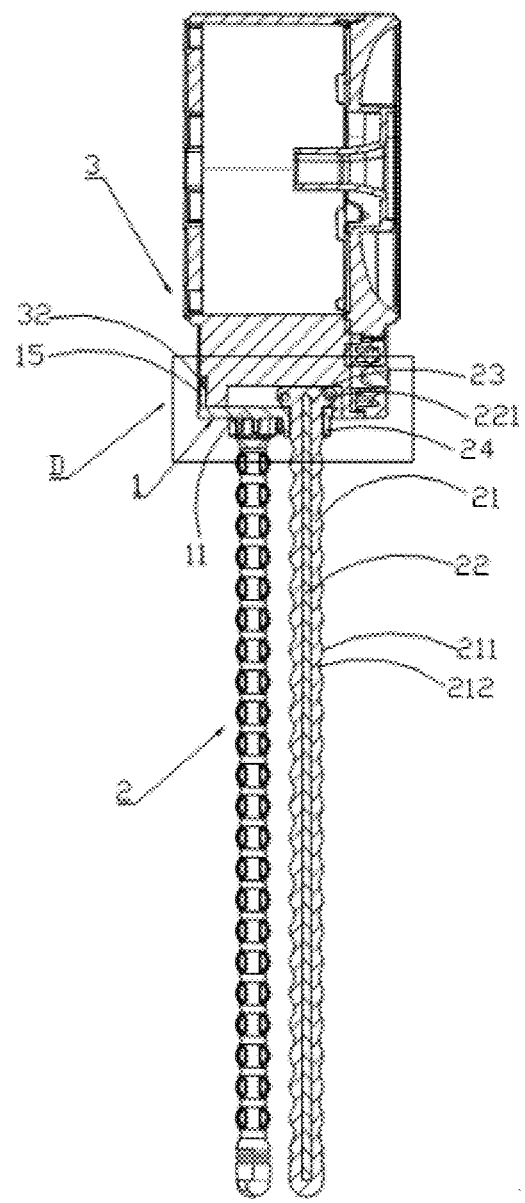
FIG. 8 is a sectional view of an installation bracket and a supporting leg of the fan according to Embodiment 1.
Figure 9:
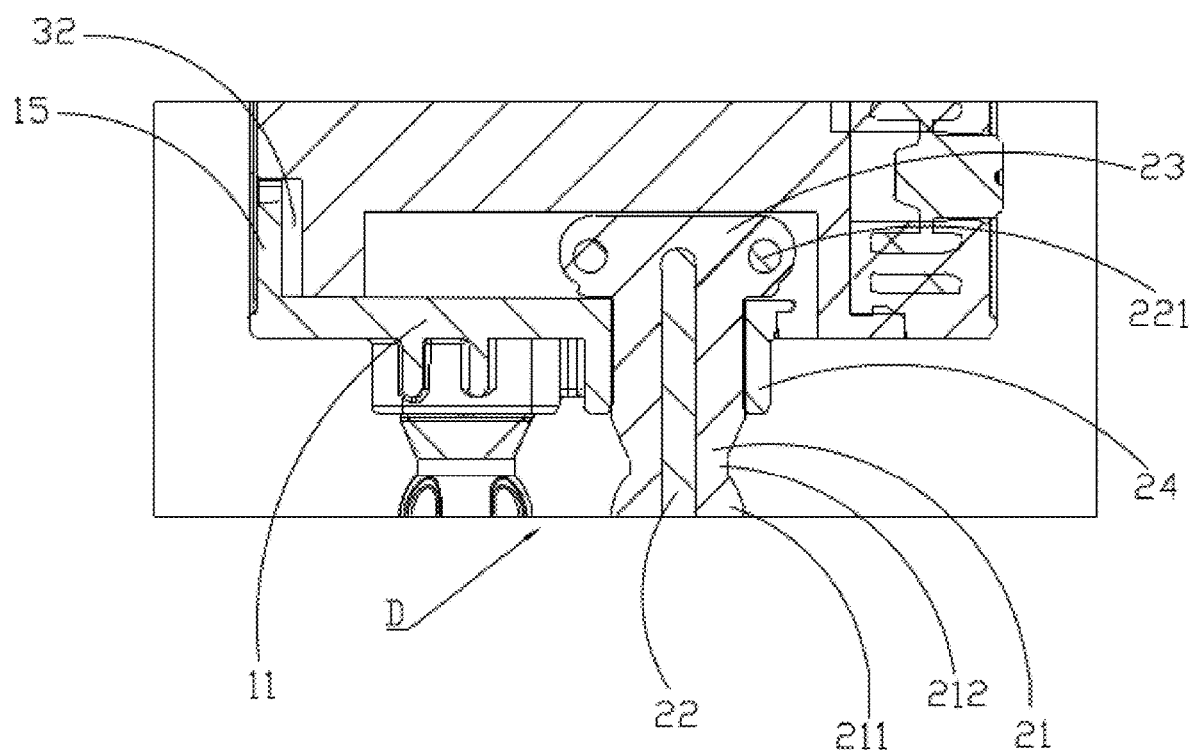
FIG. 9 is an enlarged view of Area D in FIG. 8.
Figure 10:
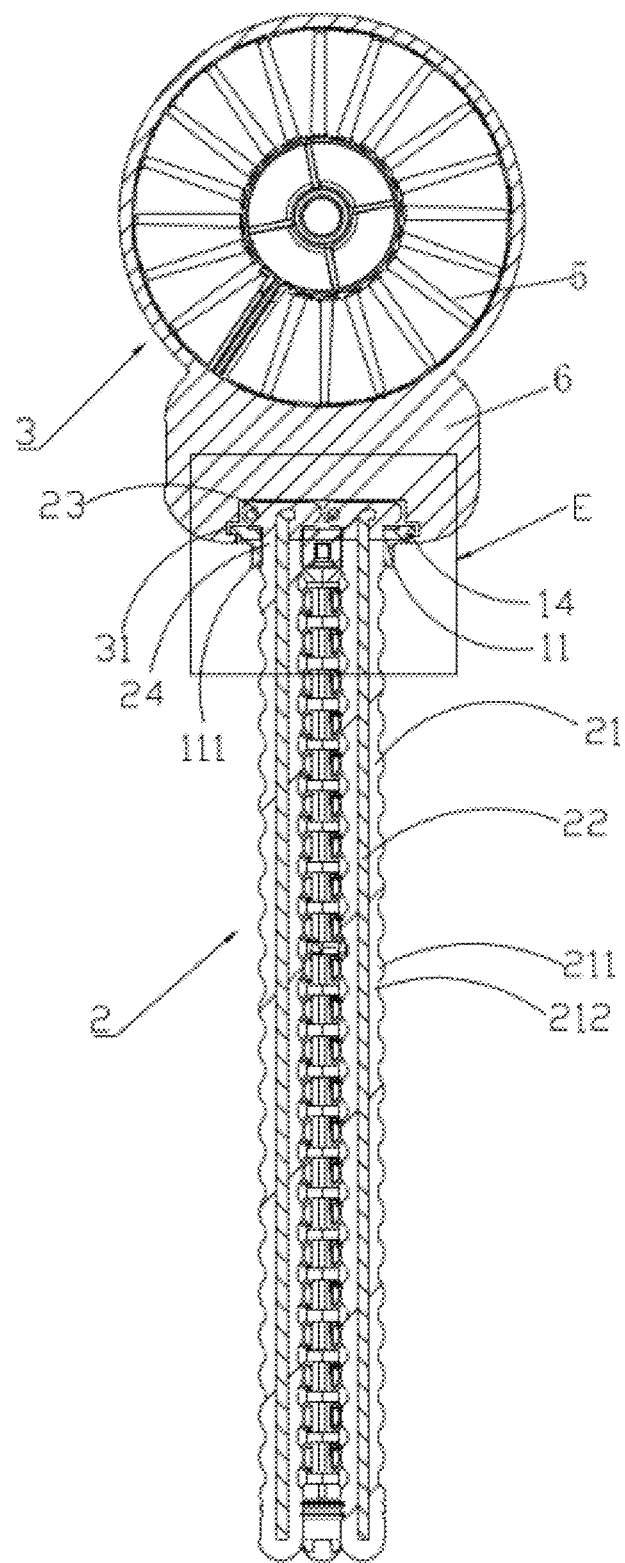
FIG. 10 is another sectional view of the installation bracket and the supporting leg of the fan according to Embodiment 1.
Figure 11:
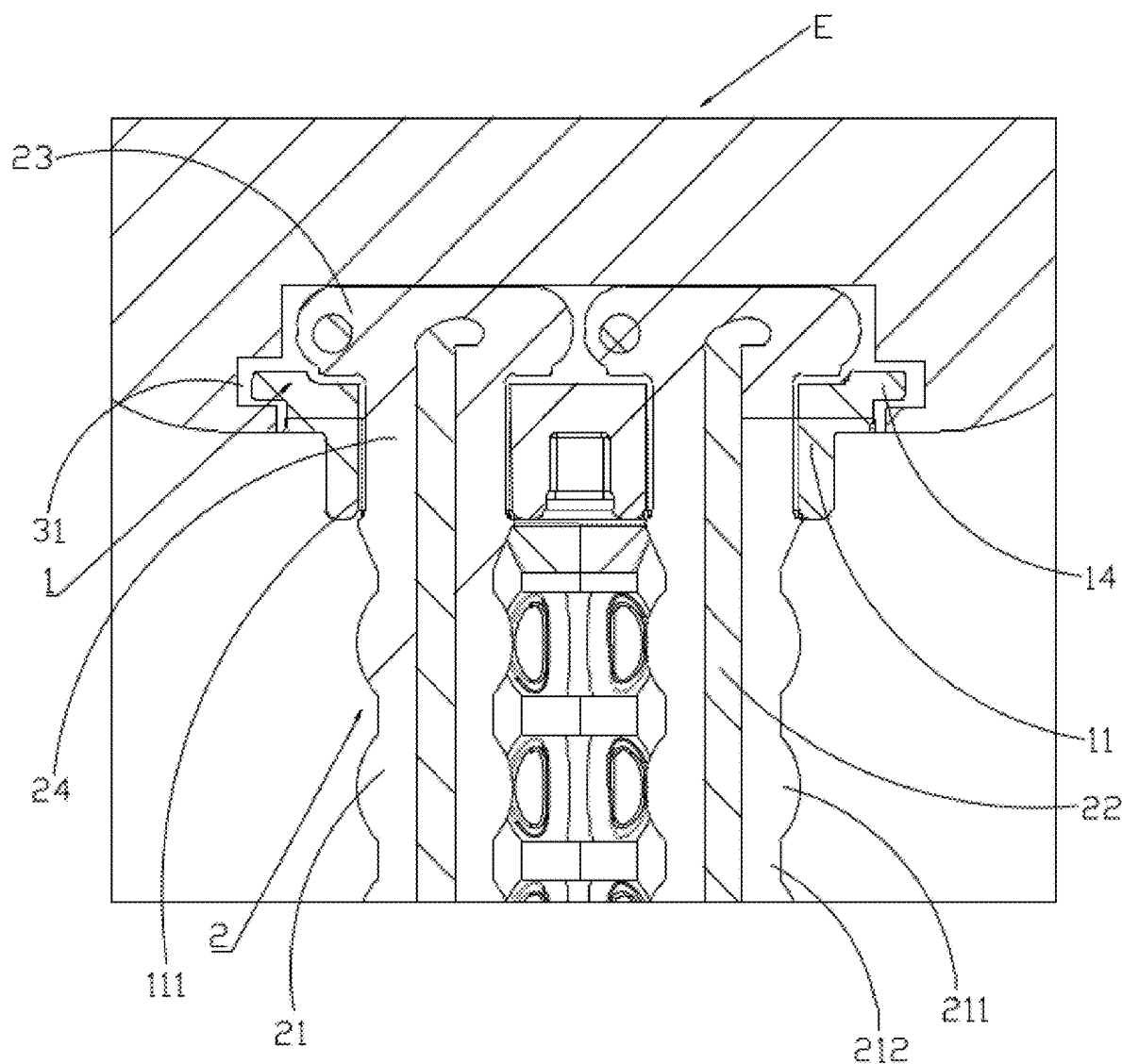
FIG. 11 is an enlarged view of Area E in FIG. 10.

Referring to FIGS. 1-11, a bracket assembly includes: an installation bracket 1, the installation bracket 1 being equipped with an installation part 11; and at least one bendable and shapeable supporting leg 2, the supporting leg 2 being connected to the installation part 11.

Through the above structure, the bracket assembly includes the installation bracket 1 and at least one bendable and shapeable supporting leg 2, the installation bracket 1 is equipped with the installation part 11, and the supporting leg 2 is connected to the installation part 11. Therefore, users can connect the installation bracket 1 to an external device, thereby attaching the bendable and shapeable supporting leg 2 to the external device, so that the external device can be suspended or supported on an external object through the bendable and shapeable supporting leg 2. At the same time, a support angle of the supporting leg 2 can be adjusted by bending the supporting leg 2, so as to adjust an angle of the external device. Moreover, a total number of the supporting legs 2 can be set to 3-10, so that the supporting legs 2 can be combined with each other to form an octopus shape to provide more stable support. For example, when it is necessary to hang the external device on a shelf, the supporting leg 2 can be bent into an annular shape, so as to hang the supporting leg 2 on the shelf, and a hanging angle of the external device can be adjusted through the bendable supporting leg 2. For another example, when it is necessary to place the external device on a flat surface such as a desktop, the supporting leg 2 can be bent to form a support surface, so as to place the supporting leg 2 on the flat surface such as the desktop, and a placement angle of the external device can be adjusted trough the bendable supporting leg 2.

The external device can be a fan, a phone holder, a humidifier, a desk lamp, a desktop decoration and other devices.

In this embodiment, the supporting leg 2 includes a flexible protective sleeve 21, and a bendable and shapeable metal wire 22. The metal wire 22 is arranged inside the flexible protective sleeve 21, so that the flexible protective sleeve 21 covers the metal wire 22. Specifically, the flexible protective sleeve 21 includes a plurality of protrusions 211 and a plurality of grooves 212. The plurality of protrusions 211 and the plurality of grooves 212 are arranged at intervals with each other. Specifically, the flexible protective sleeve 21 is a silicone protective sleeve or a rubber protective sleeve. Through the above structure, by covering the metal wire 22 with the flexible protective sleeve 21, the characteristics of the metal wire 22 being bendable and shapeable can be utilized, so that the external device can be suspended or supported on the external object through the bendable and shapeable metal wire 22. Moreover, the flexible protective sleeve 21 covered on a surface is capable of protecting the metal wire 22, while making the supporting leg 2 more beautiful and tactile. Furthermore, since the flexible protective sleeve 21 includes the plurality of protrusions 211 and the plurality of grooves 212, and the protrusions 211 and the grooves 212 are arranged at intervals with each other, the metal wire 22 of the supporting leg 2 can be bent at the grooves 212, resulting in better shaping effect and effectively improving the stability of the supporting leg 2. This facilitates an adjustment of the support angle of the supporting leg 2 to adjust the angle of the external device.

In this embodiment, the supporting leg 2 is detachably connected to the installation part 11. The installation part 11 is equipped with an installation opening 111, and the supporting leg 2 is inserted into the installation opening 111. Specifically, one end of the supporting leg 2 is equipped with a first stop part 23. The supporting leg 2 passes through the installation opening 111 from an upper surface 12 of the installation bracket 1 to a lower surface 13 of the installation bracket 1. The installation bracket 1 keeps the first stop part 23 on the upper surface 12 of the installation bracket 1. Specifically, the metal wire 22 extends from a first end of the flexible protective sleeve 21 to a second end of the flexible protective sleeve 21. An end of the metal wire 22 is equipped with a stop ring 221. The stop ring 221 is positioned within the first stop part 23. Furthermore, the supporting leg 2 is further equipped with an insertion part 24. The insertion part 24 is inserted into the installation opening 111. Through the above structure, an installation of the supporting leg 2 and the installation bracket 1 is effectively achieved, making it convenient for users to install the supporting leg 2 on the installation bracket 1. During a production process, the supporting leg 2 and the installation bracket 1 can be separately formed, and then the supporting leg 2 can be combined with the installation bracket 1 to form the bracket assembly, thereby effectively improving production efficiency and product yield (i.e., manufacturing yield).

In this embodiment, the installation bracket 1 is further provided with a sliding block 14. The sliding block 14 is used for connecting to a sliding groove of the external device. Through the above structure, the sliding block 14 on the installation bracket 1 can slide into the sliding groove of the external device to complete an installation of the bracket assembly, thereby attaching the bendable and shapeable supporting leg 2 to the external device, so that the external device can be suspended or supported on an external object through the bendable and shapeable supporting leg 2. At the same time, a support angle of the supporting leg 2 can be adjusted by bending the supporting leg 2, so as to adjust a angle of the external device. For example, when it is necessary to hang the external device on a shelf, the supporting leg 2 can be bent into an annular shape, so as to hang the supporting leg 2 on the shelf, and a hanging angle of the external device can be adjusted through the bendable supporting leg 2. For another example, when it is necessary to place the external device on a flat surface such as a desktop, the supporting leg 2 can be bent to form a support surface, so as to place the supporting leg 2 on the flat surface such as the desktop, and a placement angle of the external device can be adjusted trough the bendable supporting leg 2.

Referring to FIGS. 1-11, a fan with a bracket assembly includes: a main body of fan 3, the main body of fan 3 being equipped with an installation fitting part 31; and a bracket assembly. The bracket assembly includes an installation bracket 1 and at least one bendable and shapeable supporting leg 2. The installation bracket 1 is equipped with an installation part 11. The supporting leg 2 is connected to the installation part 11. The installation part 11 is connected to the installation fitting part 31.

Through the above structure, the fan with the bracket assembly includes the main body of fan 3 and the bracket assembly. The main body of fan 3 is equipped with the installation fitting part 31. The bracket assembly includes the installation bracket 1 and at least one bendable and shapeable supporting leg 2. The installation bracket 1 is equipped with the installation part 11. The supporting leg 2 is connected to the installation part 11, and the installation part 11 is connected to the installation fitting part 31. Therefore, users can connect the installation bracket 1 to the main body of fan 3, thereby attaching the bendable and shapeable supporting leg 2 to the main body of fan 3, so that the fan body 3 can be suspended or supported on an external object through the bendable and shapeable supporting leg 2. At the same time, a support angle of the supporting leg 2 can be adjusted by bending the supporting leg 2, so as to adjust a angle of the main body of fan 3. Moreover, a total number of the supporting leg 2 can be set to 3-10, so that the supporting legs 2 can be combined with each other to form an octopus shape to provide more stable support. For example, when it is necessary to hang the main body of fan 3 on a shelf, the supporting leg 2 can be bent into an annular shape to hang the supporting leg 2 on the shelf, and a hanging angle of the main body of fan 3 can be adjusted through the bendable supporting leg 2. For another example, when it is necessary to place the main body of fan 3 on a flat surface such as a desktop, the supporting leg 2 can be bent to form a supporting surface, so as to place the supporting leg 2 on the flat surface such as the desktop, and a placement angle of the main body of fan 3 can be adjusted through the bendable supporting leg 2.

In this embodiment, the supporting leg 2 includes a flexible protective sleeve 21 and a bendable and shapeable metal wire 22. The metal wire 22 is arranged inside the flexible protective sleeve 21, so that the flexible protective sleeve 21 covers the metal wire 22. Specifically, the flexible protective sleeve 21 includes a plurality of protrusions 211 and a plurality of grooves 212. The plurality of protrusions 211 and the plurality of grooves 212 are arranged at intervals with each other. Specifically, the flexible protective sleeve 21 is a silicone protective sleeve or a rubber protective sleeve. Through the above structure, by covering the metal wire 22 with the flexible protective sleeve 21, the characteristics of the metal wire 22 being bendable and shapeable can be utilized, so that an external device can be suspended or supported on an external object through the bendable and shapeable metal wire 22. Moreover, the flexible protective sleeve 21 covered on a surface is capable of protecting the metal wire 22, while making the supporting leg 2 more beautiful and tactile. Furthermore, since the flexible protective sleeve 21 includes the plurality of protrusions 211 and the plurality of grooves 212, and the protrusions 211 and the grooves 212 are arranged at intervals with each other, the metal wire 22 of the supporting leg 2 can be bent at the grooves 212, resulting in better shaping effect and effectively improving the stability of the supporting leg 2. This facilitates an adjustment of the support angle of the supporting leg 2 to adjust an angle of the external device.

In this embodiment, the supporting leg 2 is detachably connected to the installation part 11. The installation part 11 is equipped with an installation opening 111, and the supporting leg 2 is inserted into the installation opening 111. Specifically, one end of the supporting leg 2 is equipped with a first stop part 23. The supporting leg 2 passes through the installation opening 111 from an upper surface 12 of the installation bracket 1 to a lower surface 13 of the installation bracket 1. The installation bracket 1 keeps the first stop part 23 on the upper surface 12 of the installation bracket 1. Specifically, the metal wire 22 extends from a first end of the flexible protective sleeve 21 to a second end of the flexible protective sleeve 21. An end of the metal wire 22 is equipped with a stop ring 221. The stop ring 221 is positioned within the first stop part 23. Furthermore, the supporting leg 2 is further equipped with an insertion part 24. The insertion part 24 is inserted into the installation opening 111. Through the above structure, an installation of the supporting leg 2 and the installation bracket 1 is effectively achieved, making it convenient for users to install the supporting leg 2 on the installation bracket 1. During a production process, the supporting leg 2 and the installation bracket 1 can be separately formed, and then the supporting leg 2 can be combined with the installation bracket 1 to form the bracket assembly, thereby effectively improving production efficiency and product yield (i.e., manufacturing yield).

In this embodiment, the installation bracket 1 is further provided with a sliding block 14. The installation fitting part 31 is a sliding groove, and the sliding block 14 is connected to the sliding groove. When the sliding block 14 is connected to the sliding groove, the installation bracket 1 and an inner wall of the sliding groove cooperatively clamp the first stop part 23. Specifically, the installation bracket 1 includes the installation part 11 and a second stop part 15. The installation part 11 is connected to the second stop part 15, and the installation part 11 and the second stop part 15 are arranged at an obtuse angle, an acute angle or a right angle. The main body of fan 3 is provided with a stop groove 32, and the sliding block 14 is positioned on the installation part 11. When the sliding block 14 is connected to the sliding groove, the second stop part 15 is connected to the stop groove 32. Furthermore, the second stop part 15 is equipped with a hollow handle 151. Through the above structure, the sliding block 14 on the installation bracket 1 can slide into the sliding groove of the main body of fan 3 to complete an installation of the bracket assembly, thereby attaching the bendable and shapeable supporting leg 2 to the main body of fan 3, so that the main body of fan 3 can be suspended or supported on an external object through the bendable and shapeable supporting leg 2. At the same time, a support angle of the supporting leg 2 can be adjusted by bending the supporting leg 2, so as to adjust an angle of the main body of fan 3. For example, when it is necessary to hang the main body of fan 3 on a shelf, the supporting leg 2 can be bent into an annular shape, so as to hang the supporting leg 2 on the shelf, and a hanging angle of the main body of fan 3 can be adjusted through the bendable supporting leg 2. For another example, when it is necessary to place the main body of fan 3 on a flat surface such as a desktop, the supporting leg 2 can be bent to form a support surface, so as to place the supporting leg 2 on the flat surface such as the desktop, and a placement angle of the main body of fan 3 can be adjusted trough the bendable supporting leg 2.

It can be understood that in this embodiment, the main body of fan 3 includes a blower part 5 and a main unit 6. The blower part 5 is connected to the main unit 6. The main unit 6 integrates a control mainboard, a battery, a switch button, and other components, and is configured to control power supply to the blower part 5. By integrating all control electronic components within the main unit 6, the integration level of components is improved, space is saved, and user control is simplified. Additionally, the absence of control electronic components in the blower part 5 enables a more compact structure, reduced size, and streamlined design, thereby facilitating manufacturing and enhancing aesthetic appeal.

Embodiment 2

Figure 12:
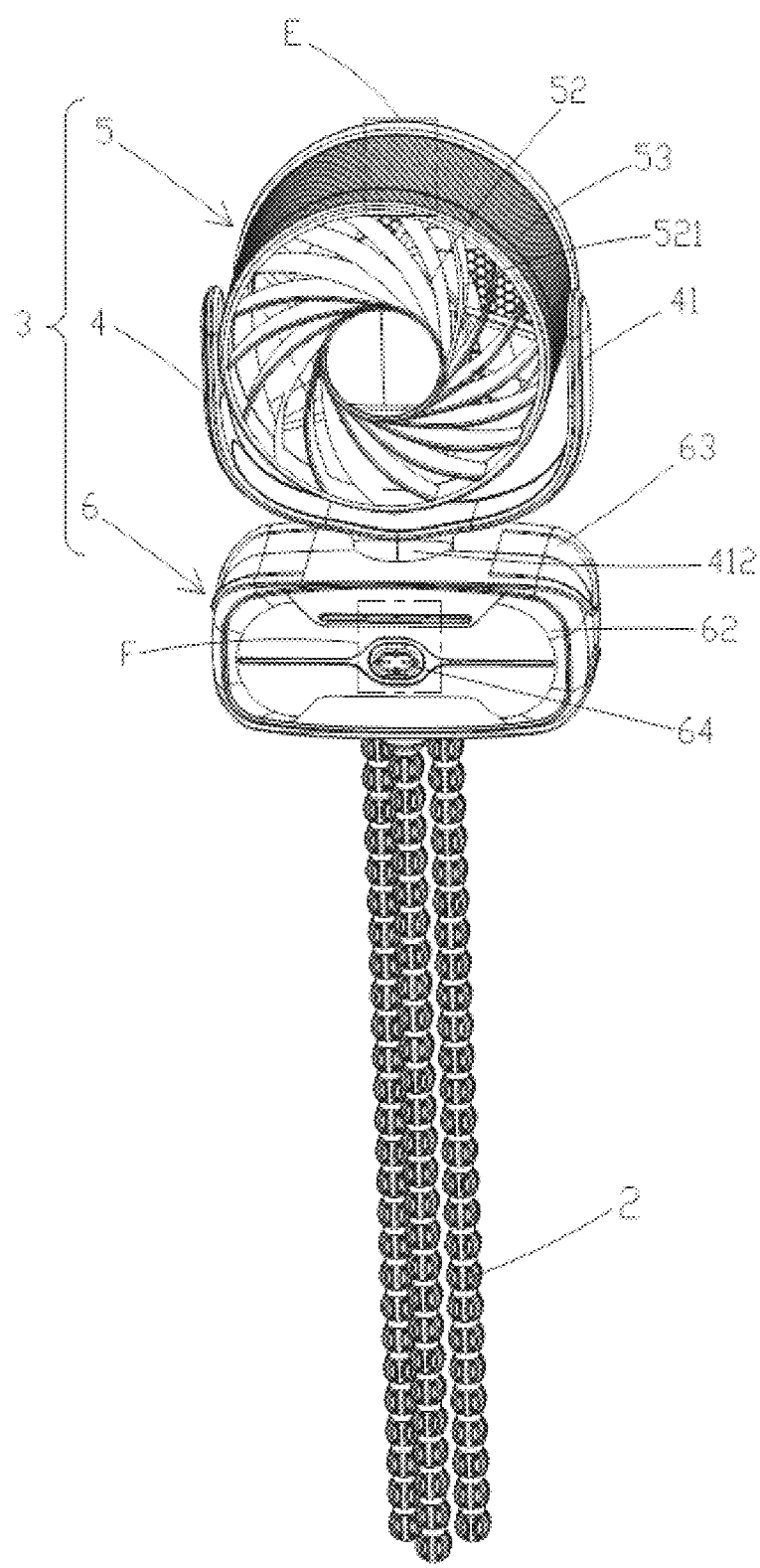
FIG. 12 is a schematic diagram of an overall structure of the fan according to Embodiment 2 of the present invention.
Figure 13:
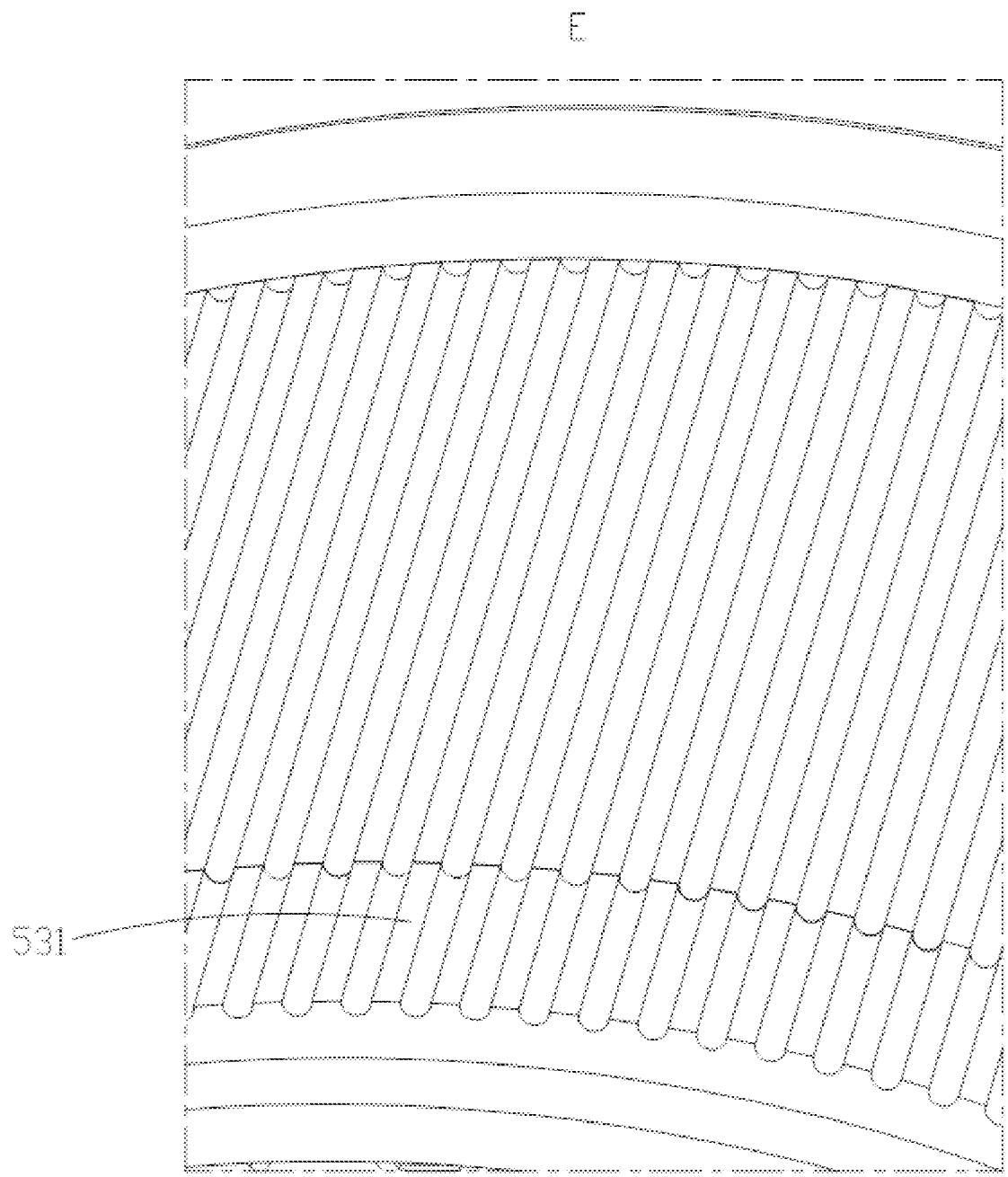
FIG. 13 is an enlarged view of Area E in FIG. 12.
Figure 14:
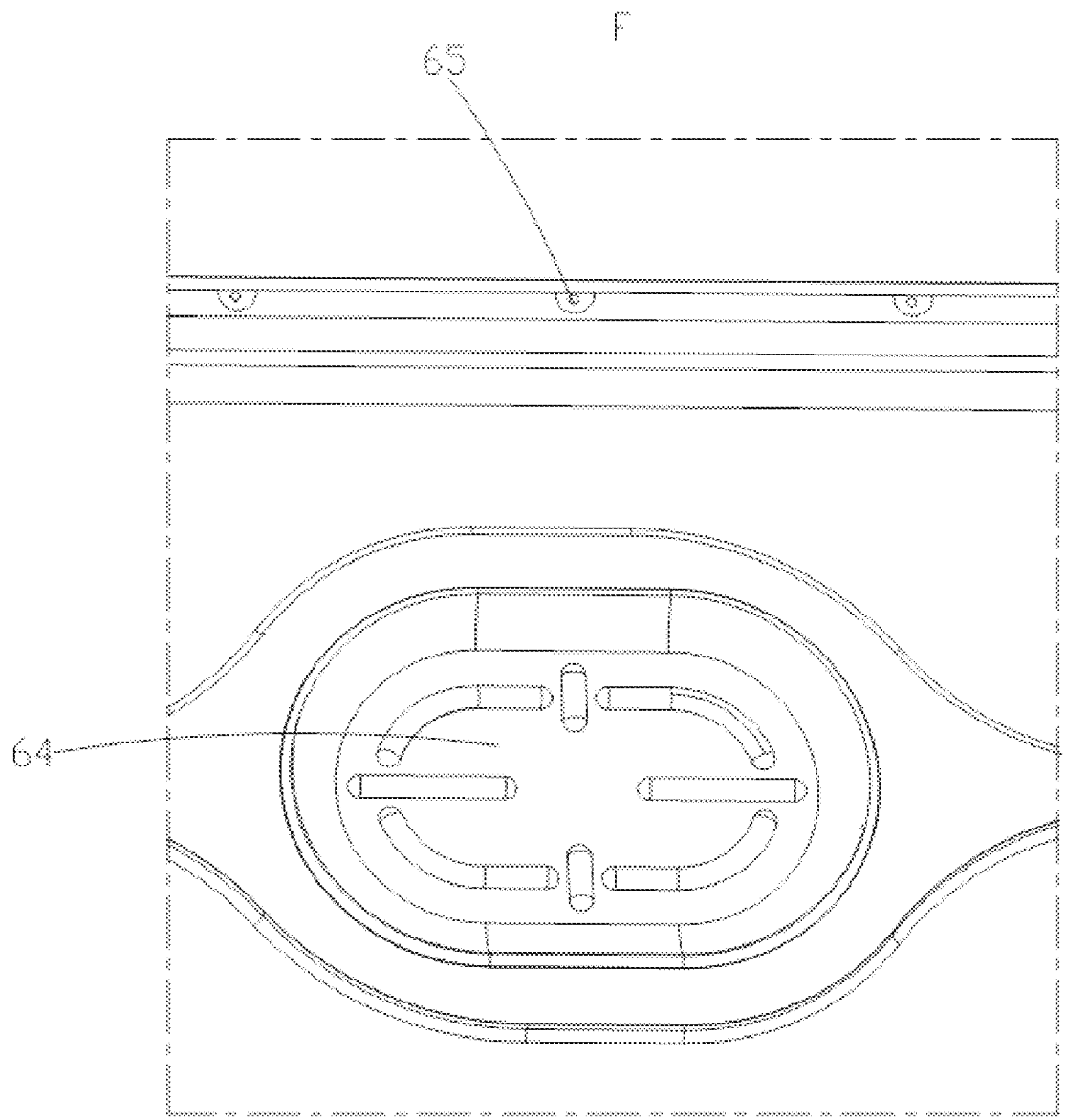
FIG. 14 is an enlarged view of Area F in FIG. 12.
Figure 15:
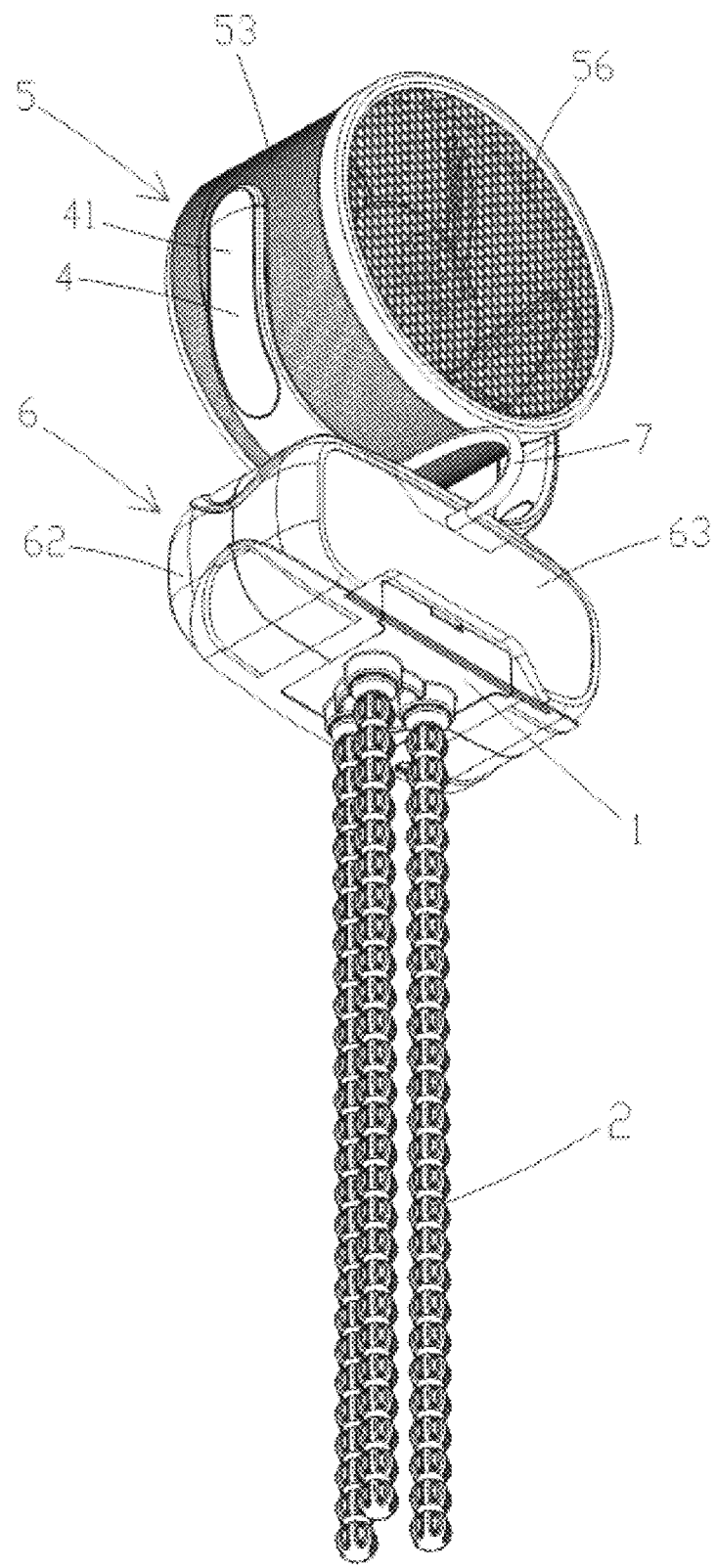
FIG. 15 is a schematic diagram of the overall structure of the fan from another angle according to Embodiment 2 of the present invention.
Figure 16:
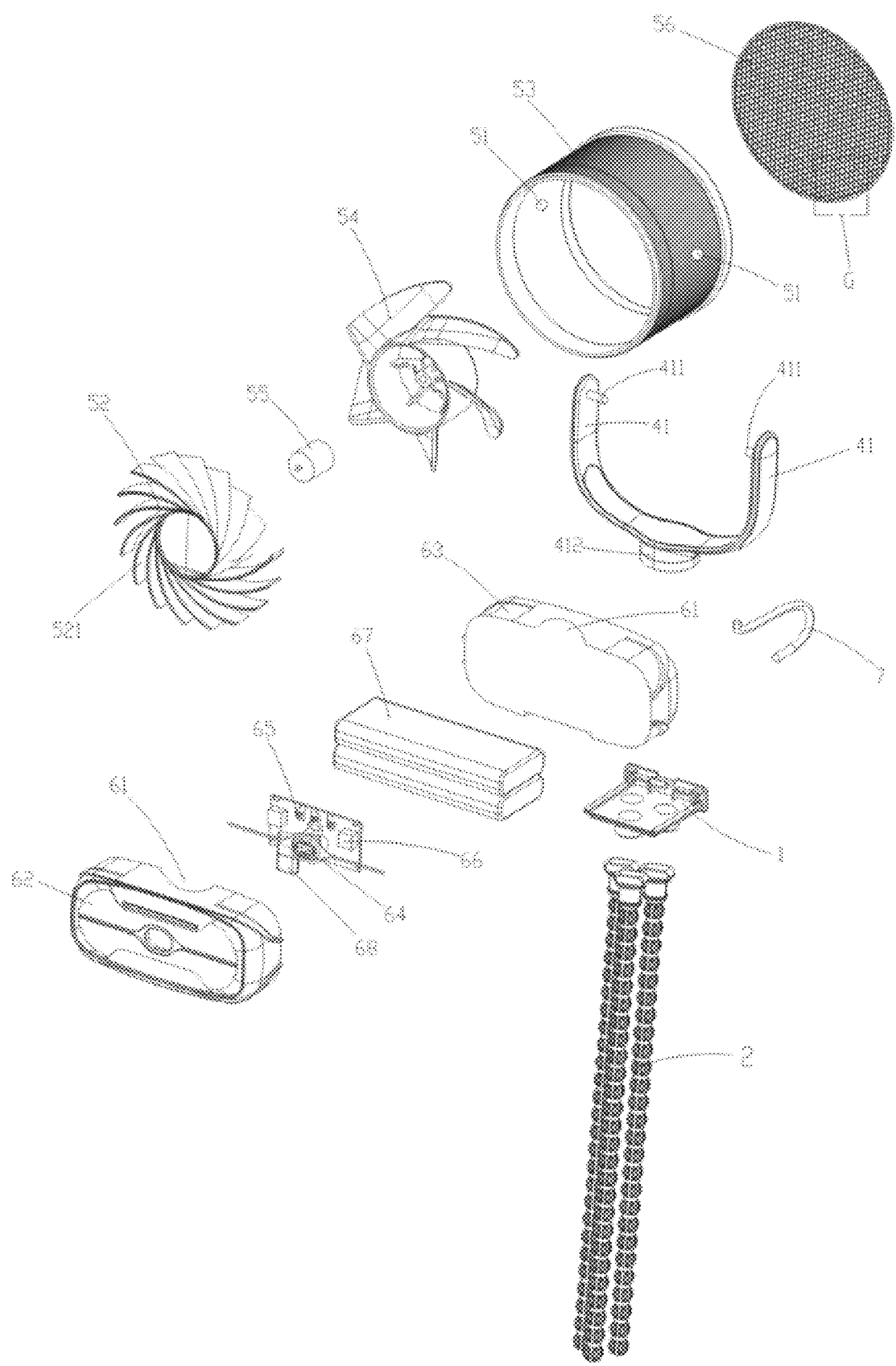
FIG. 16 is an exploded view of the fan according to Embodiment 2.
Figure 17:
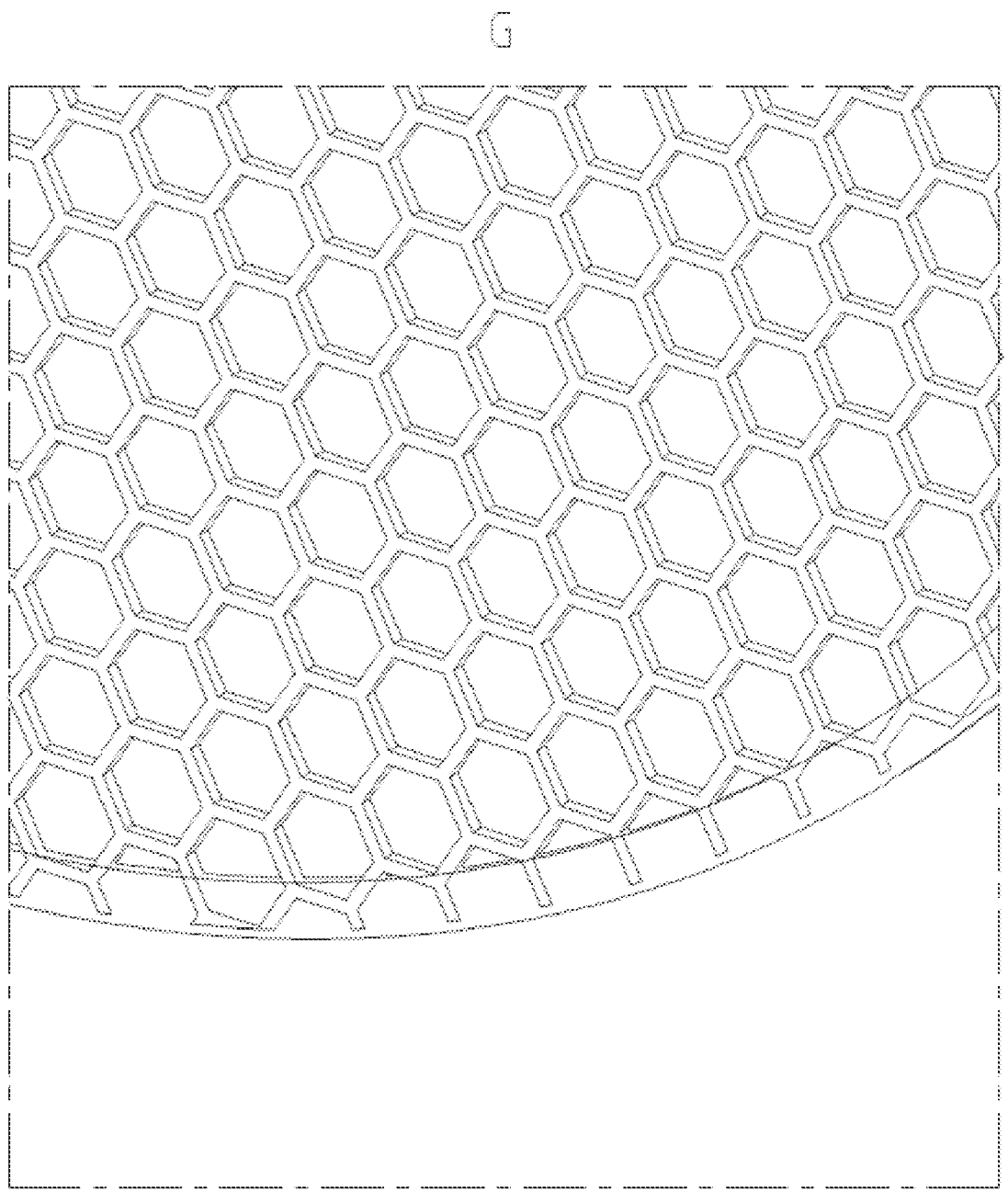
FIG. 17 is an enlarged view of Area G in FIG. 16.

Referring to FIGS. 12 to 17, a fan is provided, formed by connecting a main body of fan 3 and a bracket assembly. The main body of fan 3 includes a blower part 5 for airflow generation, a rotating bracket 4, and a main unit 6. The blower part 5, rotating bracket 4, and main unit 6 are sequentially connected from top to bottom. The main unit 6 is configured to control power supply to the blower part 5. The rotating bracket 4 is rotatably connected to both the blower part 5 and the main unit 6, thereby enabling the blower part 5 to adjust the blowing angle through rotation. The bracket assembly includes at least one bendable and shapeable supporting leg 2, configured to fix the fan to an external object.

Through the above structure, this embodiment provides a rotatable fan equipped with supporting legs 2. The rotating bracket 4 is rotatably connected to both the blower part 5 and the main unit 6, enabling multi-angle airflow adjustment of the blower part 5 when the fan is fixed, thereby providing a better user experience. At least one bendable and shapeable supporting leg 2 allows the fan to be suspended or supported on an external object. The supporting leg 2 can be bent to precisely adjust the fan's orientation and height. Furthermore, the number of supporting legs 2 can be configured to range from 3 to 10, forming an octopus-shaped configuration to provide stable support.

Specifically, the rotating bracket 4 is U-shaped, and both sides of the rotating bracket 4 are equipped with connecting arms 41. The two connecting arms 41 provide stable support for the blower part 5. A first connection shaft 411 is arranged on the inner wall of each connecting arm 41, and the blower part 5 is equipped with a first connection hole 51 matching the first connection shaft 411. The first connection shaft 411 is inserted into the first connection hole 51, allowing the blower part 5 to rotate relative to the rotating bracket 4 in a vertical direction about the first connection shaft 411. Preferably, the first connection shaft 411 and the first connection hole 51 are configured for damped rotation, thereby fixing the blower part 5 at a desired angle without reverting to their original positions due to gravity.

A second connection shaft 412 is arranged at a central position below the rotating bracket 4. A corresponding second connection hole 61 is provided on a housing of the main unit 6. The second connection shaft 412 matches the second connection hole 61. By inserting the second connection shaft 412 into the second connection hole 61, the blower part 5 and the rotating bracket 4 are enabled to rotate relative to the main unit 6 in a horizontal direction about the second connection shaft 412. Preferably, the second connection shaft 412 and the second connection hole 61 are configured for damped rotation, thereby enabling the blower part 5 and the rotating bracket 4 to be fixed at a desired angle after rotation.

Through the above structure, the blower part 5 is enabled to adjust the blowing angle in both horizontal and vertical directions, facilitating users to adjust more blowing angles and thus enhancing user experience.

In this embodiment, the blower part 5 includes an air outlet hood 52, a surrounding outer wall 53, fan blades 54, a motor 55, and an air inlet hood 56. The outer wall 53 is circumferentially arranged. The air outlet hood 52 and the air inlet hood 56 are oppositely positioned at two ends of the outer wall 53. The motor 55 and the fan blades 54 are arranged inside the outer wall 53, and the motor 55 is connected to the fan blades 54 to drive rotation of the fan blades 54. The outer wall 53 is equipped with a plurality of protruding strips 531. The air inlet hood 56 has hexagonal mesh holes, which is beneficial for making the air inlet hood 56 thinner in the manufacturing process. The air outlet hood 52 is equipped with a plurality of spiral blades 521 arranged sequentially, which enhances airflow concentration and boosts the wind force generated by the fan blades 54, thereby improving users experience. Further, the first connection hole 51 is positioned on the outer wall 53.

In this embodiment, the main unit 6 includes a first shell 62 and a second shell 63. The first shell 62 and the second shell 63 are connected to form an accommodating space. The second connection hole 61 is positioned at a junction of the first shell 62 and the second shell 63. The main unit 6 further comprises a switch button 64, an indicator light 65, and a power interface 68 arranged on the first shell 62, as well as a control mainboard 66 and a battery 67 arranged within the accommodating space. The battery 67 is electrically connected to the control mainboard 66, thereby supplying power to the entire fan. The switch button 64, the indicator light 65, and the power interface 68 are electrically connected to the control mainboard 66. The switch button 64 is configured to control activation/deactivation and speed levels of the fan through user pressing. The indicator light 65 is configured to indicate battery level and speed levels of the fan. Preferably, the power interface 68 is a Type-C or USB interface, allowing users to charge the fan via the power interface 68.

In this embodiment, the blower part 5 and the main unit 6 are electrically connected through an external conductive wire 7. Specifically, the motor 55 is electrically connected to the control mainboard 66 via the conductive wire 7. The main unit 6 supplies power to and controls activation/deactivation of the blower part 5 through the external conductive wire 7, achieving a simple and rational design.

In this embodiment, the bracket assembly further includes an installation bracket 1. The installation bracket 1 is equipped with an installation part 11, and the supporting leg 2 is detachably connected to the installation part 11. The main unit 6 is equipped with an installation fitting part 31, and the installation part 11 is connected to the installation fitting part 31. The installation part 11 is equipped with an installation opening 111, and the supporting leg 2 is inserted into the installation opening 111. Specifically, one end of the supporting leg 2 is equipped with a first stop part 23. The supporting leg 2 passes through the installation opening 111 from an upper surface 12 of the installation bracket 1 to a lower surface 13 of the installation bracket 1. The installation bracket 1 retains the first stop part 23 on the upper surface 12 of the installation bracket 1. Specifically, the metal wire 22 extends from one end of the flexible protective sleeve 21 to the other end of the flexible protective sleeve 21. An end of the metal wire 22 is equipped with a stop ring 221, and the stop ring 221 is positioned within the first stop part 23. Further, the supporting leg 2 is additionally equipped with an insertion part 24, and the insertion part 24 is inserted into the installation opening 111. Through the above structure, the connection between the supporting leg 2 and the installation bracket 1 is effectively realized, facilitating users installation of the supporting leg 2 onto the installation bracket 1. During manufacturing, the supporting leg 2 and the installation bracket 1 can be separately formed and subsequently assembled into the bracket assembly, thereby improving production efficiency and product yield.

In this embodiment, the supporting leg 2 includes a flexible protective sleeve 21 and a bendable and shapeable metal wire 22. The metal wire 22 is arranged inside the flexible protective sleeve 21, such that the flexible protective sleeve 21 covers the metal wire 22. Specifically, the flexible protective sleeve 21 comprises a plurality of protrusions 211 and a plurality of grooves 212. The protrusions 211 and the grooves 212 are arranged at intervals with each other. Specifically, the flexible protective sleeve 21 is a silicone protective sleeve or a rubber protective sleeve. Through the above structure, the flexible protective sleeve 21 covering the metal wire 22 allows utilization of the bendable and shapeable characteristics of the metal wire 22, thereby enabling the external device to be suspended or supported on an external object via the bendable and shapeable metal wire 22. Additionally, the flexible protective sleeve 21 on the surface protects the metal wire 22 while improving the aesthetic appeal and tactile feel of the supporting leg 2. Furthermore, since the flexible protective sleeve 21 comprises the protrusions 211 and grooves 212 arranged at intervals, the metal wire 22 of the supporting leg 2 can be bent at the grooves 212, achieving superior shaping effects and effectively enhancing the stability of the supporting leg 2. This facilitates adjustment of the supporting angle of the supporting leg 2 to regulate the angle of the external device.

In this embodiment, the installation bracket 1 is further equipped with a sliding block 14, configured to connect to a sliding groove of an external device. Through the above structure, the sliding block 14 on the installation bracket 1 can be slid into the sliding groove of the external device, thereby completing installation of the bracket assembly and attaching the bendable and shapeable supporting leg 2 to the external device. This allows the external device to be suspended or supported on an external object via the bendable and shapeable supporting leg 2. Additionally, the supporting angle of the supporting leg 2 can be adjusted by bending it, thereby regulating the angle of the external device. For example, when it is necessary to suspend the external device on a shelf, the supporting leg 2 can be bent into an annular shape to hang the supporting leg 2 on the shelf, and the suspension angle of the external device can be adjusted through the bendable supporting leg 2. For another example, when it is necessary to place the external device on a flat surface such as a desktop, the supporting leg 2 can be bent to form a support surface, allowing it to rest on the desktop, and the placement angle of the external device can be adjusted via the bendable supporting leg 2.

The above description only describes embodiments of the present invention, and is not intended to limit the present invention; various modifications and changes can be made to the present invention. Any modifications, equivalent substitutions, and improvements made within the spirit and scope of the present invention are intended to be included within the scope of the present invention.

What is claimed is:

1. A fan comprising:
    a main body of the fan and a bracket assembly, wherein the main body is connected to the bracket assembly; the main body comprises a blower part for blowing air and a main unit, and the main unit is configured to control air blowing of the blower part; the bracket assembly comprises at least one bendable and shapeable supporting leg configured to fix the fan to an external object;
    wherein the main body further comprises a rotating bracket, the rotating bracket is arranged between the blower part and the main unit and is configured to connect the blower part and the main unit, thereby enabling the blower part to rotate and adjust a blowing angle;
    the blower part is rotatably connected to the rotating bracket, thereby enabling the blower part to be rotated in a vertical direction; the rotating bracket is further rotatably connected to the main unit, thereby enabling the blower part and the rotating bracket to be rotated in a horizontal direction;
    wherein the main unit comprises a first shell and a second shell, and the first shell and the second shell are connected to form an accommodating space; the main unit defines an upper surface on both the first shell and the second shell, and an opposite lower surface on both the first shell and second shell, the rotating bracket is rotatably connected to the upper surface; the main unit further comprises a switch button, an indicator light, a power interface arranged on the first shell, and a control mainboard and a battery arranged within the accommodating space; the switch button, the indicator light and the power interface are electrically connected to the control mainboard, and the control mainboard is electrically connected to the battery; and
    wherein the lower surface of the main unit is equipped with an installation fitting part, the bracket assembly further comprises an installation bracket, the installation bracket is equipped with an installation part detachably connected to the installation fitting part, and the supporting leg is detachably connected to the installation part.

2. The fan of claim 1, wherein an end portion of the rotating bracket is equipped with a connecting arm, and the connecting arm is rotatably connected to the blower part.

3. The fan of claim 2, wherein the blower part is equipped with a first connection hole, a first connection shaft matching the first connection hole is arranged on an inner wall of the connecting arm, and the first connection shaft is inserted into the first connection hole, thereby rotatably connecting the rotating bracket to the blower part.

4. The fan of claim 3, wherein the blower part comprises an air outlet hood, a surrounding outer wall, fan blades, a motor, and an air inlet hood; the air outlet hood and the air inlet hood are oppositely positioned at two ends of the outer wall, and the fan blades are connected to the motor and arranged inside the outer wall; the air outlet hood is equipped with a plurality of spiral blades; the outer wall is equipped with a plurality of protruding strips; mesh holes on the air inlet hood are hexagonal; and the first connection hole is positioned on the outer wall.

5. The fan of claim 2, wherein the rotating bracket is U-shaped, the number of the connecting arms is two, and the connecting arms are positioned on both sides of the rotating bracket.

6. The fan of claim 1, wherein the rotating bracket is further equipped with a second connection shaft, a second connection hole matching the second connection shaft is arranged on the main unit, and the second connection shaft is inserted into the second connection hole, thereby enabling the rotating bracket to be rotatably connected to the main unit, wherein the second connection hole is positioned on both the first shell and the second shell.

7. The fan of claim 1, wherein the main body further comprises an external conductive wire, and the blower part and the main unit are electrically connected through the conductive wire.

8. The fan of claim 1, wherein the installation part is equipped with an installation opening, and the supporting leg is inserted into the installation opening.

9. The fan of claim 8, wherein one end of the supporting leg is equipped with a first stop part, the supporting leg passes through the installation opening from an upper surface of the installation bracket to a lower surface of the installation bracket, and the installation bracket retains the first stop part on the upper surface of the installation bracket.

10. The fan of claim 9, wherein the supporting leg is further equipped with an insertion part, and the insertion part is inserted into the installation opening.

11. The fan of claim 9, wherein a metal wire extends from one end of a flexible protective sleeve to the other end of the flexible protective sleeve, an end of the metal wire is equipped with a stop ring, and the stop ring is positioned within the first stop part.

12. The fan of claim 9, wherein the installation bracket is further equipped with a sliding block, the installation fitting part is a sliding groove, and the sliding block is connected to the sliding groove.

13. The fan of claim 12, wherein when the sliding block is connected to the sliding groove, the installation bracket and an inner wall of the sliding groove cooperatively clamp the first stop part.

14. The fan of claim 1, wherein the supporting leg comprises a flexible protective sleeve, and a bendable and shapeable metal wire, and the metal wire is arranged inside the flexible protective sleeve, so that the flexible protective sleeve covers the metal wire.

15. The fan of claim 14, wherein the flexible protective sleeve comprises a plurality of protrusions and a plurality of grooves, and the plurality of protrusions and the plurality of grooves are arranged at intervals with each other.

16. A fan comprising:
    a main body and a bracket assembly, wherein the main body is connected to the bracket assembly; the main body comprises a blower part for blowing air and a main unit, and the main unit is configured to control air blowing of the blower part; the bracket assembly comprises at least one bendable and shapeable supporting leg configured to fix the fan to an external object;

wherein the bracket assembly further comprises an installation bracket, the installation bracket is equipped with an installation part, and the supporting leg is detachably connected to the installation part;

wherein the main unit is equipped with an installation fitting part, and the installation part is connected to the installation fitting part;

wherein the installation part is equipped with an installation opening, and the supporting leg is inserted into the installation opening;

wherein one end of the supporting leg is equipped with a first stop part, the supporting leg passes through the installation opening from an upper surface of the installation bracket to a lower surface of the installation bracket, and the installation bracket retains the first stop part on the upper surface of the installation bracket;

wherein the installation bracket is further equipped with a sliding block, the installation fitting part is a sliding groove, and the sliding block is connected to the sliding groove; and wherein when the sliding block is connected to the sliding groove, the installation bracket and an inner wall of the sliding groove cooperatively clamp the first stop part.

\* \* \* \* \*